US006567522B1

(12) United States Patent
Blackburn

(10) Patent No.: US 6,567,522 B1
(45) Date of Patent: May 20, 2003

(54) VOLTAGE ALTERNATING SWITCH CIRCUIT

(75) Inventor: Thomas L. Blackburn, San Jose, CA (US)

(73) Assignee: GoDigital Telecommunications, Inc., Fremont, CA (US)

(*) Notice: Subject to any disclaimer, the term of this patent is extended or adjusted under 35 U.S.C. 154(b) by 0 days.

(21) Appl. No.: 09/295,046

(22) Filed: Apr. 20, 1999

(51) Int. Cl.[7] ................................ H04M 19/00

(52) U.S. Cl. ........................ 379/413; 178/69 F; 307/95

(58) Field of Search ........................ 379/413; 178/69 F; 307/95

(56) References Cited

U.S. PATENT DOCUMENTS

| | | | | |
|---|---|---|---|---|
| 286,282 A | * | 10/1883 | Delany | 178/69 F |
| 3,987,240 A | * | 10/1976 | Schultz | 725/149 |
| 4,425,512 A | * | 1/1984 | Tomooka et al. | 379/413 |
| 5,014,305 A | * | 5/1991 | Moisin | 379/413 |
| 5,436,822 A | * | 7/1995 | West, Jr. | 363/63 |
| 5,517,172 A | | 5/1996 | Chiu | 340/310.01 |

OTHER PUBLICATIONS

American Radio Relay League, The Radio Amateur's Handbook, 1973, p. 116.*

"Single–Chip SDSL/HDSL Transceiver," RS8973, Rockwell Semiconductor Systems, Inc., Aug. 1998.

"T1/E1 Line Interface," DS154F2, Crystal Semiconductor Corporation, May 1996.

* cited by examiner

*Primary Examiner*—Forester W. Isen
*Assistant Examiner*—Daniel Swerdlow
(74) *Attorney, Agent, or Firm*—Sierra Patent Group, Ltd.

(57) ABSTRACT

Method and apparatus for alternately providing positive and negative direct current voltages to a single twisted pair includes a power source configured to provide a first signal and a second signal, the first and second signals having different polarities, a controller configured to provide a control signal in accordance with a predetermined timing signal, and a voltage alternating switch circuit having first and second output terminals, the voltage alternating switch circuit coupled to the power source configured to receive the first and second signals, the voltage alternating switch circuit further coupled to the controller configured to receive the control signal, and in accordance thereto, providing first and second signals alternately to first and second output terminals, such that the adverse corrosive effect of positive voltage line powering is minimized.

54 Claims, 4 Drawing Sheets

104
POWER SUPPLY
105
BATTERY
101
CONTROLLER
-
+
102
VOLTAGE ALTERNATING SWITCH CIRCUIT
To Transceiver
103
LINE TRANSFORMER
+/- V
+/- V
Transmission Line

VOLTAGE ALTERNATING SWITCH CIRCUIT

BACKGROUND OF THE INVENTION

1. Field of the Invention

The present invention is related to line powering for single twisted pair for use in communication systems. In particular, the present invention relates to method and apparatus for alternately delivering negative and positive polarity dc voltages across a single twisted pair.

2. Description of the Related Art

Techniques for delivering dc voltage over a single twisted pair commonly known as line powering is known. Typically, line powering is used for providing power to remote terminals in a Digital Subscriber Loop (DSL) system or a T1/E1 system where a central office provides power to operate a remote terminal and where the central office is connected to the remote terminal via a single twisted copper pair in the case of a DSL system, and by two twisted copper pairs in the case of a T1/E1 system.

For safety reasons, there are restrictions on the level of permissible dc voltages over the twisted copper pair, and several class ratings are assigned for the various operating voltages. For example, a Class A1 voltage rating limits the permissible current to less than 0.15 mA for magnitude of dc voltages between 30 and 200 volts. However, there is no current limit imposed for magnitude of dc voltages below 30 volts. A Class A2 voltage rating limit is defined for current less than 5 mA for the magnitude of dc voltage range defined between 80 to 200 volts. For magnitude of dc voltages below 80 volts, there is not current limit. Finally, Class A3 rating is defined for the magnitude of dc voltages between 140 to 200 volts whose permissible current can go as high as 10 mA. For the magnitude of dc voltages less than 140 volts under the Class A3 rating, no current limit is imposed. As mentioned above, the current limitation under the various ratings is imposed as a safety precaution for telephone company personnel if they come into direct contact with either the Ring or the Tip terminal which comprise the single twisted copper pair coupling the central office to the remote terminal.

Asymmetric Digital Subscriber Line (ADSL), High-speed Digital Subscriber Line (HDSL), and other types of DSL technologies and T1/E1 system available today are presently pushing for distances to as much as 100 Kft using line powering. To reach such distances, the magnitude of line powering voltages between the Tip terminal and the Ring terminal (Tip-to-Ring) as high as 400 volts is necessary. In order to provide such line powering voltages and comply with the safety class rating discussed above, a +/−200 volts is used between the Tip terminal and ground terminal (Tip-to-Ground), and between the Ring terminal and the ground terminal (Ring-to-Ground) which would fall under the Class A2 rating.

One significant problem with using the above-discussed voltages is that whenever a positive voltage is applied to the terminals, those terminals are prone to corrosion. An electrically conducting material such as metal wires are susceptible to oxidation which results from a difference in the electrical potential of the surrounding ground and the conducting material. A known approach to compensate for the deterioration from oxidation is cathodic protection whereby a small electric charge is applied between the conducting material to be protected and the ground to oppose the flow of electrons such that the applied voltage is greater than the oxidation voltage. The negative charge thus applied to the transmission lines for line powering therefore provides cathodic protection from deterioration of the transmission lines from oxidation. Moreover, due to this corrosion effect on the transmission lines, customers are not likely to install systems that use positive voltages, and therefore, the suppliers of the equipment to these customers must limit the voltages to negative dc voltage only. Naturally, such limitation is a severe trade-off for the distance that can be reached with the line powered single twisted cable pair.

SUMMARY OF THE INVENTION

In view of the foregoing, there are provided method and apparatus for alternately delivering positive and negative dc voltages to a single twisted pair to minimize the corrosive effect of the positive dc voltage.

A system for providing line powering to a twisted pair configured to transmit and/or receive signals in accordance with one embodiment of the present invention includes a power supply for generating power signals; a voltage alternating switch circuit operatively coupled between the power supply and a twisted pair; and a controller coupled to the voltage alternating switch circuit for providing control signals thereto to control line powering to the twisted pair.

A method for providing line powering to a twisted pair configured to transmit and/or receive signals in accordance with another embodiment of the present invention comprises the steps of: discharging line voltages from a plurality of transmission lines; alternating the voltage signals to alternately provide to the respective transmission lines; and applying the alternated voltage signals to each transmission line such that each polarity of the voltage signal applied to each transmission line is reversed.

A method for providing line powering to a twisted pair configured to transmit and/or receive signals in a communication system in accordance with yet another embodiment of the present invention includes the steps of: monitoring the telephone lines coupled to the communication system to determine whether they are on hook or off hook; discharging line voltages from a plurality of transmission lines; alternating the voltage signals to alternately provide to the respective transmission lines; and applying the alternated voltage signals to each transmission line such that each polarity of the voltage signal applied to each transmission line is reversed.

An apparatus for alternately providing signals in accordance with yet one embodiment of the present invention includes a power supply configured to provide a plurality of signals each having a different polarity; a plurality of terminals; a switching network including: a resistance; a first pair of switches operatively coupled between said power supply and said plurality of terminals, and a second pair of switches operatively coupled between said resistance, said power supply and said plurality of terminals; and a controller coupled to said switching network to control said switching network in accordance with a predetermined timing such that each of said terminals alternately receive said different polarity signals in accordance with said predetermined timing.

An apparatus for alternately providing signals in accordance with yet another embodiment of the present invention includes a power supply configured to provide a plurality of signals each having a different polarity; a plurality of terminals; a switching network including: a resistance; a first pair of switches operatively coupled between said power supply and said plurality of terminals, and a second pair of switches operatively coupled between said resistance, said power supply and said plurality of terminals; and a controller coupled to said switching network to control said switching network in accordance with a predetermined timing such that each of said terminals alternately receive said different polarity signals in accordance with said predetermined timing; wherein said controller controls said switching network such that during a first portion of said predetermined timing, said power supply is coupled to said plurality of terminals and during a second portion of said predetermined timing, said resistance is coupled to said plurality of terminals.

A method of alternately providing signals in accordance with still another embodiment of the present invention includes the steps of: providing a plurality of signals each having a different polarity from a signal source; selectively coupling a first pair of switches between said signal source and a plurality of terminals; selectively coupling a second pair of switches between a resistance, said signal source and said plurality of terminals; and providing a plurality of control signals such that said first and second pairs of switches are selectively coupled in accordance with a predetermined timing and each of said terminals alternately receive said different polarity signals in accordance with said predetermined timing.

These and other features and advantages of the present invention will be understood upon consideration of the following detailed description of the invention and the accompanying drawings.

DESCRIPTION OF THE PREFERRED EMBODIMENT

Figure 1:
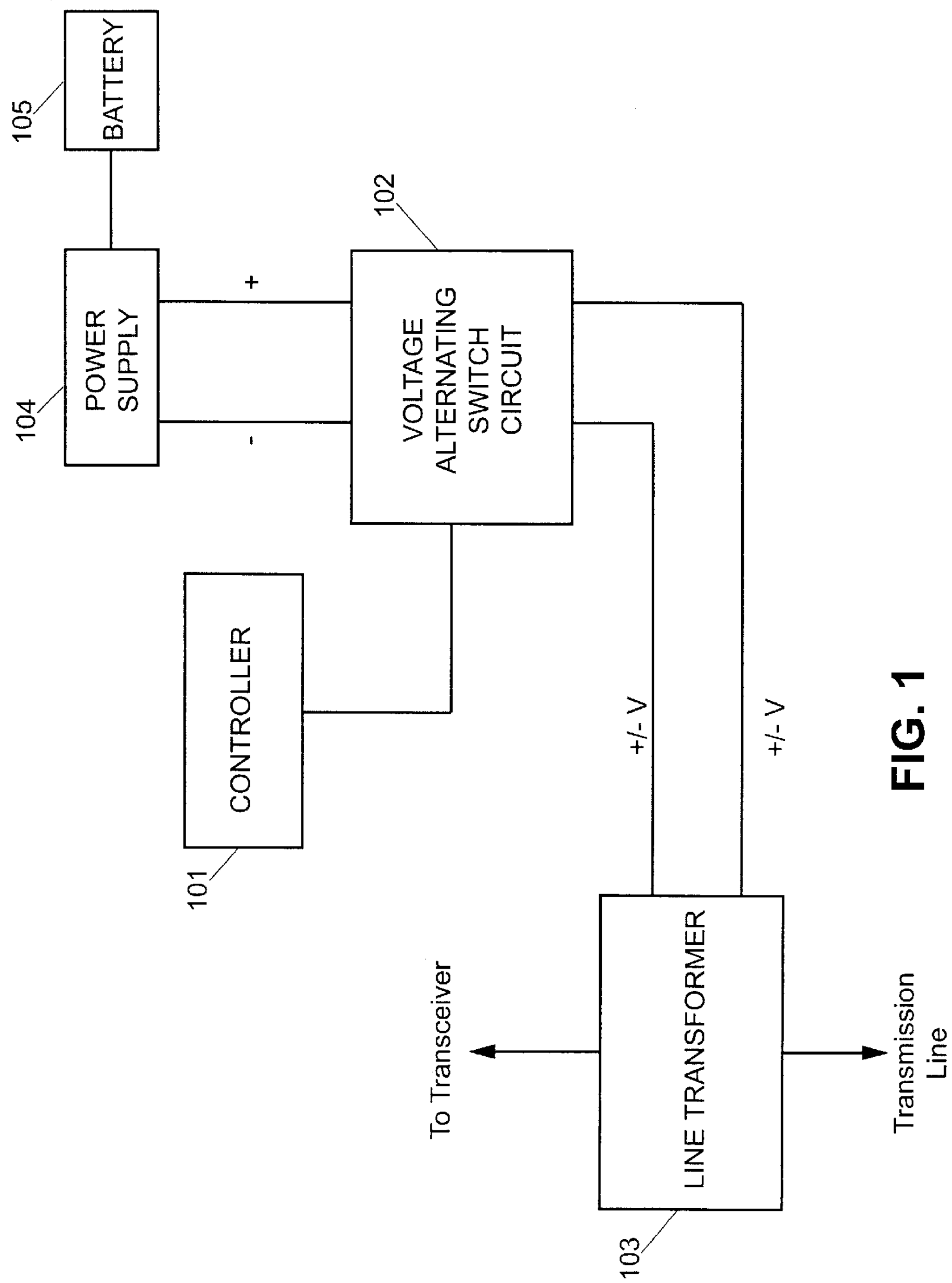
FIG. 1 is an overall block diagram of the voltage alternating switch system in accordance with one embodiment of the present invention.

FIG. 1 illustrates a voltage alternating switch system in accordance with one embodiment of the present invention. As shown, there are provided controller 101 coupled to voltage alternating switch circuit 102 which is configured to control the dc voltage alternating between positive and negative polarities. In addition to controlling the voltage alternating switch circuit 102, the controller 101 also includes a utility microprocessor (not shown) which is configured to manage the voice signals, to configure and control the central office components, and to communicate with the remote terminal through the control channel (multiplexed on the subscriber loop).

Further shown in FIG. 1 is line transformer 103 coupled to a transceiver (not shown). The transceiver provides the interface for the subscriber loop and is configured to transmit data to and receive data from the remote terminal. Multiplex voice, data, control, and signaling information from the remote terminal is transmitted over the subscriber loop and received by the transceiver. In the opposite direction, a multiplex stream of voice, data, control and signaling information is passed from the central office multiplexer by the transceiver to the remote terminal over the subscriber loop. Conventional transceivers which are commercially available may be used. For example, in the present embodiment, a RS8973 Single-chip SDSL/HDSL Transceivers available from Rockwell Corporation is used in the present embodiment. The operational details of the RS8973 Transceiver is described in Advanced Information N8973DSA, Rockwell Semiconductor Systems (August, 1998) which is incorporated herein by reference. Moreover, as explained in the Advanced Information N8973DSA, Rockwell Semiconductor Systems, the line transformer 101 may be configured to have a transformer inductance of approximately 3.5 mHenry.

The line transformer 103 provides dc voltages to the transmission lines which are coupled to main distribution frame. Moreover, the line transformer 103 provides impedance matching between the transceiver and the transmission lines and isolation between the high voltage transmission lines and the low voltage (typically at 3 or 5 volts) digital logic of the transceiver.

FIG. 1 further shows that line transformer 103 is coupled to the voltage alternating switch circuit 102 and power supply 104 coupled to the voltage alternating switch circuit 102. As can be seen, the power supply 104 is configured to provide the positive and the negative dc voltages to the voltage alternating switch circuit 102. In turn, the voltage alternating switch circuit 102 provides the positive and negative dc voltages to the line transformer 103 in accordance with control signals generated from the controller 101. Thus, the voltage alternating switch circuit 102 selectively alternates the polarity of the dc voltages provided to the line transformer 103 such that the single twisted copper pair (i.e., the transmission lines) in the DSL system (or each of the two twisted copper pairs in a T1/E1 system) is provided with alternating dc voltages over a predetermined time period. An example of the predetermined time period to alternate the polarity of the dc voltages provided to the transmission lines is 20 hours. However, this time period can be modified to more than 20 hours or less depending upon the suitability in the intended application.

In the present embodiment, the power supply 104 is a switch mode type having a typical input voltage magnitude of −44 Vdc to +60 Vdc, and takes as its input the battery voltage from battery 105 which is located in the central office. Alternatively, the power supply 104 can be coupled to an outside battery voltage source, i.e., from a remotely located cabinet with an AC/DC converter. The power supply 105 converts the −44 Vdc to different voltages to power the system shown in FIG. 1, for example, at +5V and −5V for analog components, +5V or +3.3V for digital components, and the transmission lines at +190 Vdc, −190 Vdc. While the high voltage can be modified according to the system requirement, its magnitude depends upon the system capacity, required subscriber cable length, safety limitations, and so on. Generally, these voltage values are in the range of +/− 80V to +/− 200V.

For example, for systems which fall under the Class A2 rating, if the magnitude of the dc voltage is maintained below 140 Vdc, then there is no current limit requirement when measuring current flow from the Tip-to-Ground terminal or the Ring-to-Ground terminal. However, if the dc voltage is between 140 and 200 volts, the current limit requirement dictates a current of less than 10 mA which can conduct from the Tip terminal to the ground terminal (Tip-to-Ground) or from the Ring terminal to the ground terminal (Ring-to-Ground).

Figure 2:
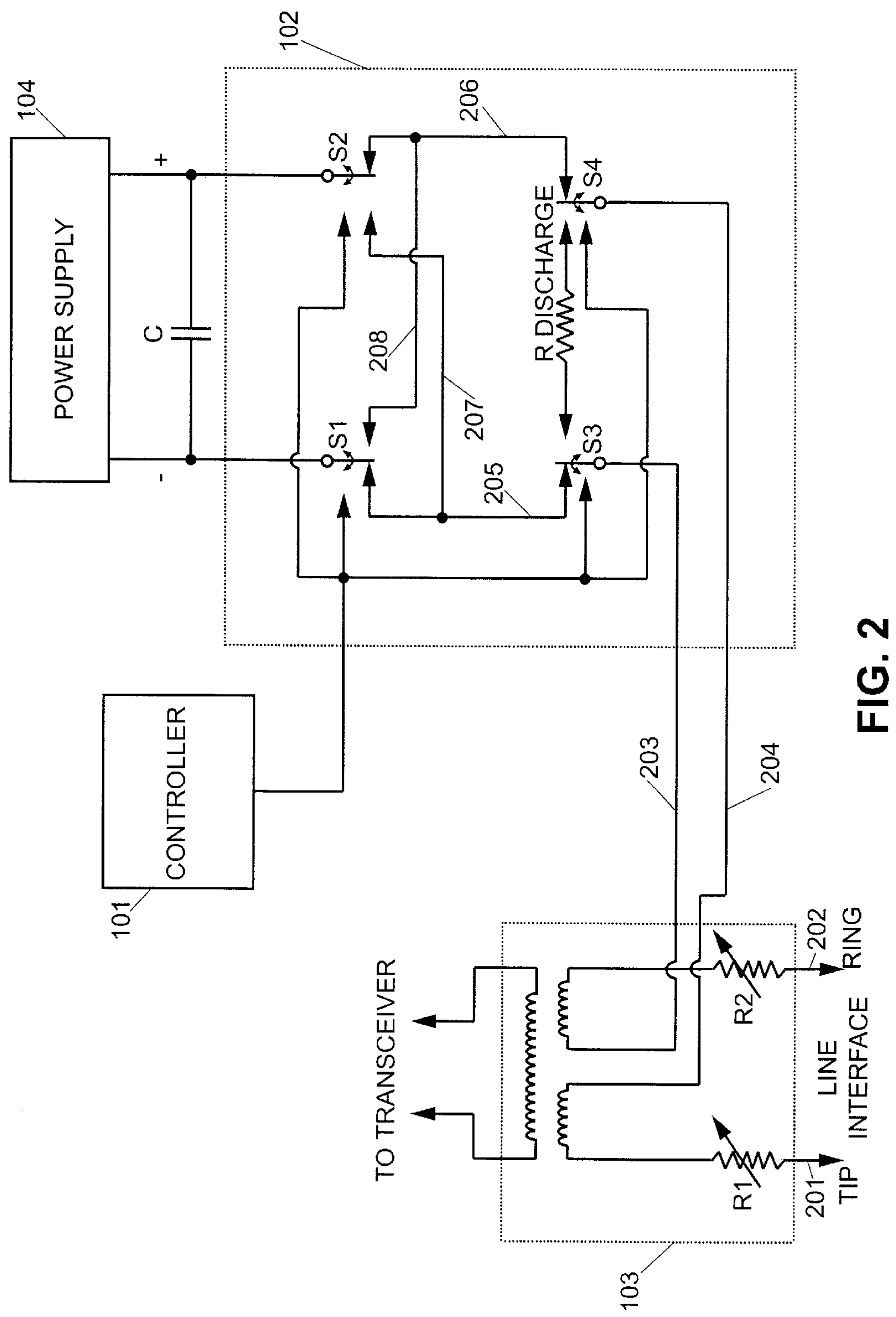
FIG. 2 is a detailed diagram of the voltage alternating switch system of FIG. 1 in accordance with one embodiment of the present invention.

FIG. 2 illustrates a detailed schematic of the voltage alternating switch system in accordance with one embodiment of the present invention. As can be seen, like parts of the system shown in FIG. 1, such as the controller 101 and the power supply 104 are similarly labeled in the embodiment illustrated in FIG. 2. Moreover, the voltage alternating switch circuit 102 and the line transformer 103 of FIG. 1 is illustrated in further detail as shown in FIG. 2.

In particular, as shown, the voltage alternating switch circuit 102 includes a plurality of switches $S_1$, $S_2$, $S_3$ and $S_4$, each of which is configured to switch between respective two positions in accordance with control signals from the controller 101. Switch $S_1$ is coupled to the negative output terminal of the power supply 104 and configured to switch between switch $S_1$ first position coupling a first lead 203 of the line transformer 103 and switch $S_1$ second position coupling a second lead 204 of the line transformer 103, while switch $S_2$ is coupled to the positive output terminal of the power supply 104 and configured to switch between switch $S_2$ first position coupling the second lead 204 of the line transformer 103 to switch $S_2$ second position coupling the first lead 203 of the line transformer 103. Moreover, switch $S_3$ is coupled to the first lead 203 of the line transformer 103 while switch $S_4$ is coupled to the second lead 204 of the line transformer 103. Also shown in FIG. 2 are interconnections 205, 206, 207, and 208 between the four switches $S_1$, $S_2$, $S_3$, and $S_4$ operatively coupled therebetween to provide the above-described switch coupling configuration. Moreover, switch $S_3$ is configured to selectively couple the first lead 203 of the line transformer 103 to the first position of switch $S_1$ and a discharge resistor $R_D$ at switch $S_3$ first and second positions, respectively, while switch $S_4$ is configured to selectively couple the second lead 204 of the line transformer 103 to the first position of switch $S_2$ and the discharge resistor $R_D$ at switch $S_4$ first and second positions, respectively. In this manner, as will be further explained below, the controller 101 (for example, a microcontroller configured to provide control signals to control the switching sequence of switches $S_1$, $S_2$, $S_3$ and $S_4$) controls the switching sequence configuration of switches $S_1$, $S_2$, $S_3$ and $S_4$ such that the positive voltage and the negative voltage from the power supply 104 is alternately provided to each of the transmission lines 201, 202 via leads 203, 204 of line transformer 103.

The discharge resistor $R_D$ selectively coupled between the second position of switch $S_3$ and the first position of switch $S_4$ is configured to discharge the component capacitors (not shown) across the Tip/Ring terminals that are coupled to the transmission lines 201, 202. The component capacitors have magnitude of approximately 2.2 $\mu$Farads. However, the size of the component capacitors may be adjusted to suit other xDSL (or T1/E1) systems which use values ranging from 1.0 $\mu$Farads to 2.2 $\mu$Farads. The value of the discharge resistor $R_D$ in accordance with one embodiment of the present invention is 1,000 Ω. However, the size of the discharge resistor $R_D$ can be modified in accordance with the system requirements and the necessary transmission line voltages.

As discussed above, the discharge resistor $R_D$ is configured to discharge the component capacitors which are coupled across the transmission lines 201, 202 downstream from the central office of the system shown in FIG. 2. For example, the present embodiment can be configured to have as many as ten 2.2 $\mu$Farad capacitors across the transmission lines 201, 202. More specifically, each component in a Central Office—Repeater—Remote Terminal system configuration includes capacitors across the transmission lines that are charged up to the value of the transmission line voltage. Thus, prior to the transmission line voltage reversal, it is desirable to discharge these charges stored in the various capacitors as much as possible to prevent current spikes (or surges) from flowing when the transmission line voltage is alternated or reversed. If these capacitors are not discharged prior to alternating or reversing the voltage on each of the transmission line, a large current surge may result due to the instantaneous polarity change across the capacitors. This current surge, in turn, may cause the system to have adverse effects upon the synchronization of the system and its components. For example, in a DSL system which includes a central office, one or more straight-thru repeater if necessary, and a remote terminal coupled in series with the DSL transmission lines, each of these components are provided with one or more 2.2 $\mu$Farad capacitors. Moreover, each component is further provided with a diode bridge which couples the DSL transmission line voltage to a large power supply capacitor whose typical capacitance is in the order of 200 $\mu$Farads. It is to be noted that, depending upon the power supply requirements of each component, the magnitude of power supply capacitors can range between 50 $\mu$Farads to 1,000 $\mu$Farads or higher.

When the 2.2 $\mu$Farad capacitors in the components begin to discharge, the power supply capacitors in these components also begin to discharge, but at a slower rate relative to the 2.2 $\mu$Farad capacitors since they are no longer being provided with the DSL line voltage. During the discharge of the power supply capacitors, the stored energy in these power supply capacitors are sufficient to continuously power the respective components for approximately 1–2 seconds. Moreover, as discussed above, depending upon the value of the power supply capacitors in each component, the discharge period above can be lower than 1–2 seconds or significantly higher than 1–2 seconds. Accordingly, in order to maintain the voltage alternating switch system in operating condition during the discharge procedure of the 2.2 $\mu$Farad capacitors, it can be seen that the 2.2 $\mu$Farad capacitors must be discharged and then re-charged to the opposite polarity during the 1–2 second window.

Also shown in FIG. 2 is a capacitor C which is coupled between the positive and negative terminals of the power supply 104. The capacitor C is provided to separate the dc signal components from the ac signals in the system in accordance with the present invention and to minimize the transient signals, such that the dc signals on the Tip terminal is electrically separated from the dc signals on the Ring terminal. Moreover, because the capacitor C is provided as coupled to the positive and negative terminals of the power supply 104 such that the voltage polarity on the two ends of the capacitor C does not change, unlike the component capacitors at 2.2 $\mu$Farad, it is unnecessary to discharge the capacitor C using the discharge resistor $R_D$.

Further shown in FIG. 2 is a detailed diagram of the line transformer 103 of FIG. 1. In particular, there is provided a plurality of variable resistors $R_1$, $R_2$ respectively coupled to the transmission Ring and the Tip lines 201, 202, respectively, of the system shown herein. The line transformer 103 couples the 2B1Q transceiver signals to/from the transmission lines 201, 202 and isolates the transceiver and other electronic circuits from the transmission line high voltages. Accordingly, the variable resistors $R_1$, $R_2$ are poly-fuses which are used for protection. When large current flows through these variable resistors $R_1$, $R_2$ due to lightning or power cross faults, the variable resistors $R_1$, $R_2$ configured as fuses heat up and open, providing high impedance to limit the current flow. Thereafter, when the power cross faults are removed and the fuses cool down, they return to their initial resistor values.

Figure 3:
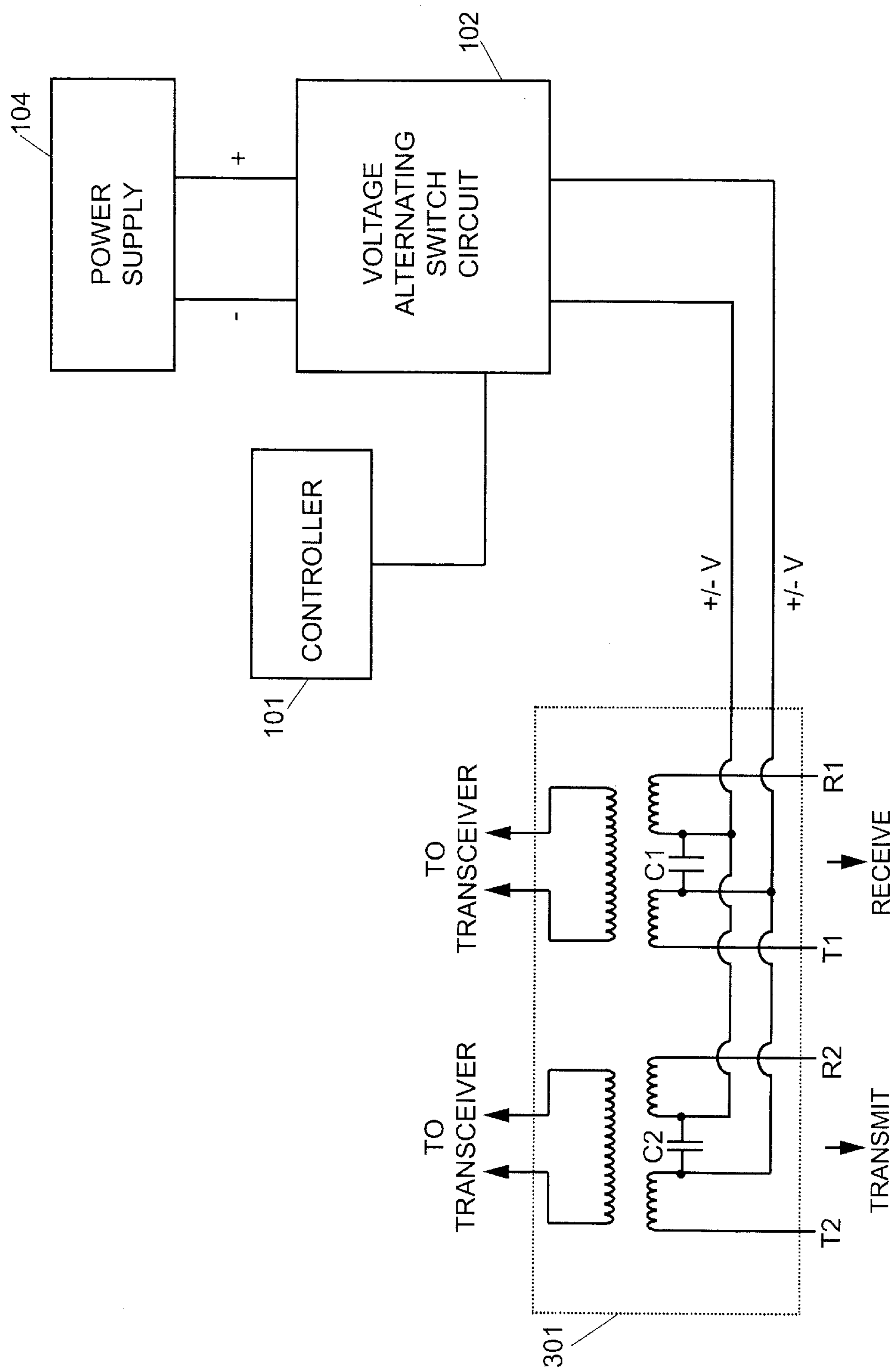
FIG. 3 is detailed diagram of the line transformer for a T1/E1 system in accordance with another embodiment of the present invention.

FIG. 3 illustrates a detailed configuration of the line transformer 103 for use in a T1/E1 system in the voltage alternating switch system in accordance with another embodiment of the present invention. In particular, since the T1/E1 system uses two twisted copper pairs (compared to a single twisted copper pair in a DSL system), as shown in the figure, the positive and negative dc voltages are alternately provided to the Tip and Ring terminals of each twisted copper pair. Moreover, in the voltage alternating switch system shown in FIG. 3, capacitors $C_1$ and $C_2$ are provided between the leads coupling the voltage alternating switch circuit 102 and the line transformer 301 that are alternately provided with positive and negative dc voltages. Accordingly, since the polarity of the capacitors $C_1$ and $C_2$ will alternate as the dc voltages are alternately provided to each of the two leads coupling line transformer 301, the value of the discharge resistor $R_D$ in the voltage alternating switch circuit needs to be modified accordingly to discharge the excess charge stored in capacitors $C_1$ and $C_2$ as a result of the periodic polarity alternating between the two leads coupled to each capacitors $C_1$ and $C_2$.

Figure 4:
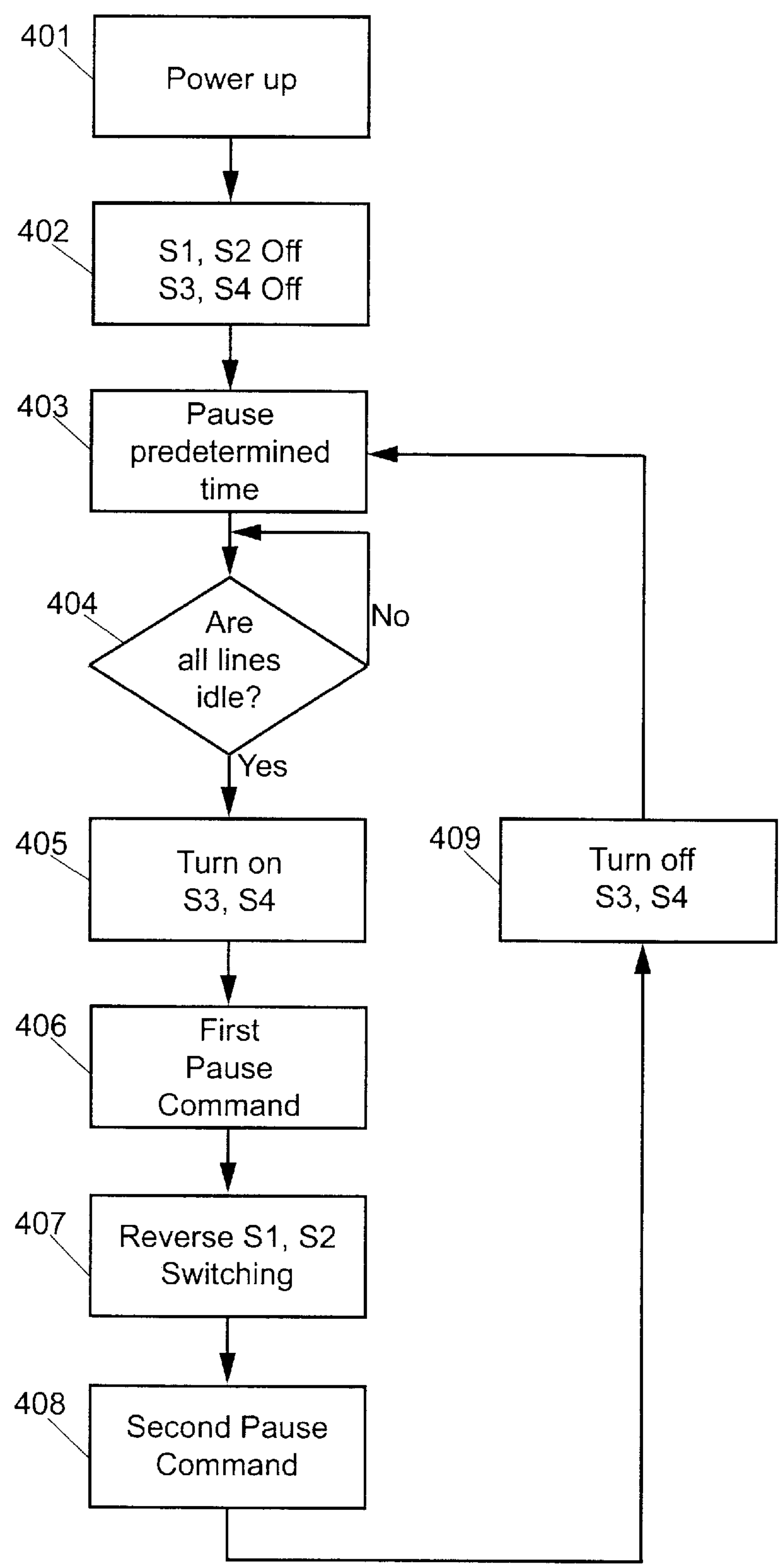
FIG. 4 illustrates a flow chart of the voltage alternating switch system control method in accordance with one embodiment of the present invention.

FIG. 4 shows a flow chart of the voltage alternating switch system in accordance with one embodiment of the present invention. As shown, upon power up of the system at step 401, switches $S_1$, $S_2$ and switches $S_3$, $S_4$ are set to OFF state defined as their initial non-activated condition at step 402. Upon completion of the initialization procedure at step 402, the voltage alternating switch system enters a process loop from step 403 through step 409 as explained in further detail below in accordance with the control signals from the controller 101 (FIG. 1).

At step 403, a pause command from the controller 101 is generated to provide a waiting period for the voltage alternating switch system cycle for a predetermined time period between each voltage alternating cycle. In accordance with one embodiment of the present invention, the predetermined time period can be set to 20 hours. Then at step 404, it is determined whether all of the telephone lines are on hook, i.e., in an idle state, to confirm that none of the lines are in use by a customer at the time the voltage alternating switch procedure in accordance with the present invention is executed. This determination ensures that none of the lines are disrupted during usage at the time the voltage alternating switch system is executed to reverse (or alternate) the transmission line voltages.

If it is determined at step 404 that not all of the lines are in the idle condition, then the procedure continues to inquire as to whether all of the lines are idle until it is determined that all of the lines are in idle condition. Upon determination that all of the lines are in idle condition at step 404, switches $S_3$ and $S_4$ are turned ON at step 405. Thereafter at step 406, the controller 101 (FIG. 1) generates a further control signal to execute a 500 ms pause procedure for the system. During the 500 ms pause period, the transmission line voltage is removed from the transmission lines 201, 202 and the discharge resistor $R_D$ is coupled across the transmission lines 201, 202 to discharge the 2.2 $\mu$Farad capacitors coupled across the transmission lines 201, 202. Once the 500 ms pause procedure is completed at step 406, the controller 101 (FIG. 1) generates a further control signal to reverse the switching position of switches $S_1$ and $S_2$. Accordingly, as switches $S_1$ and $S_2$ were initially set to the OFF position at step 402, these switches $S_1$ and $S_2$ are switched to the ON position in accordance with the control signal from the controller 101 (FIG. 1). After reversing the switching position of switches $S_1$ and $S_2$, a further pause command is provided at step 408 from the controller 101 at step 408 to provide a settling time for switches $S_1$ and $S_2$ before the reversed polarity voltage is applied to the DSL lines 201, 202. In accordance with one embodiment of the present invention, the pause command executed at step 408 has a duration of 20 ms. Finally, at step 409, switches $S_3$ and $S_4$ are switched to the OFF position to provide reversed polarity voltages to transmission lines 201, 202, thus completing the first process loop, and the procedure returns to step 403.

It is to be noted that the initialization procedure at step 402 at which switches $S_1$, $S_2$ and switches $S_3$, $S_4$ are set to the initial, non-activated state (OFF position) is implemented once at the beginning of the process loop for the voltage alternating switch system. Further, it is to be noted that unless the central office is de-powered from the −48 Vdc input, the initialization step 402 is not executed again.

One example of the switching sequence of switches $S_1$, $S_2$, $S_3$ and $S_3$ controlled by the control signals from the controller 101 during one reversal cycle is explained with the Table 1 as shown below.

TABLE 1

Voltage Alternating Switch System Switching Configuration

| Switch | Initialization Stage | Discharging Stage | Alternating Stage | Powering Stage |
|---|---|---|---|---|
| $S_1$ | ○ | ○ | X | X |
| $S_2$ | ○ | ○ | X | X |
| $S_3$ | ○ | X | X | ○ |
| $S_4$ | ○ | X | X | ○ |

where "O" indicates that the switch is in OFF state corresponding to the respective first position of each of switches $S_1$, $S_2$, $S_3$, and $S_4$ as discussed above, and where "X" indicates that the switch is in ON state corresponding to the respective second position of each of the four switches.

In particular, during the Initialization Stage as shown on Table 1, steps 401–404 as shown in FIG. 4 and described above is executed, initializing each of the four switches $S_1$, $S_2$, $S_3$, and $S_4$ and verifying that all lines connected to the transmission lines are on hook (i.e., all lines are idle) prior to implementing the voltage alternating switch procedure. At the Discharging Stage, step 405 is executed such that switches $S_3$ and $S_4$ are each now in their respective second positions coupling the leads 203, 204 of the line transformer 103 (which are ultimately coupled to the transmission lines 201, 202, respectively) to the discharge resistor $R_D$. As explained above, at this point, the line voltage on the transmission lines 201, 202 are removed therefrom, and further, the 2.2 $\mu$Farad capacitors coupled across the transmission lines 201, 202 are discharged.

After steps 405 and 406 of FIG. 4 are completed removing the transmission line voltage and discharging the capacitors coupled therebetween, the voltage alternating switch procedure proceeds to the Alternating Stage as shown in Table 1 during which step 407 (FIG. 4) is executed such that the dc voltage supply provided to each of the transmission lines 201, 202 is now configured for alternating (or reversal) between the two lines. 201, 202 via the switching network such that each of the transmission lines 201, 202 are now each configured to receive reversed polarity dc voltage from the power supply 104 (FIG. 2). That is, for example, switches $S_1$ and $S_2$ as shown in FIG. 2 are now in their respective second positions, providing the negative and positive dc voltages, respectively, from the power supply 104 to interconnection pairs 206, 208, and 207, 205, respectively. Once switches $S_1$ and $S_2$ are settled from switching from the respective first to second positions, the voltage alternating switch procedure proceeds to the Powering Stage (as shown in Table 1) such that the reversed polarity dc voltages are provided to the respective leads 203, 204 of the line transformer 103 (FIG. 2) such that the Tip and Ring terminals (transmission lines 201, 202, respectively) are each provided with reversed polarity dc voltage, respectively. For example, in the case where the Tip terminal received the positive dc voltage while the Ring terminal received the negative dc voltage, upon completion of the voltage alternating switch procedure in accordance with the present invention, the Tip terminal receives the negative dc voltage from the power supply while the Ring terminal receives the positive dc voltage.

As discussed above, in accordance with the present invention, there are provided method and apparatus for delivering high line powering voltages and substantially eliminating the corrosion problem associated with positive voltages along the single twisted pair or transmission lines. In particular, in accordance with the present invention, cathodic protection of the twisted cable pair is achieved by reversing (or alternating) the voltage applied periodically. Thus, the amount of time the positive dc voltage is applied on each of the terminals of the transmission lines or the twisted cable pair is reduced by half, leading to a decrease in the rate of corrosion, and thus, a significant increase in the life of the transmission lines.

Particular application of the method and apparatus disclosed herein can be found, for example, in the transmission of multiple voice, data, video, and alarm signals over existing single twisted pair lines when positive dc voltages are desired to extend the reach of these systems, and remain within the Class A3 limits and provide a non-corrosive environment.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A system for providing line powering to a twisted pair configured to transmit and/or receive signals, comprising:

a power supply for generating power signals, said power signals include a positive voltage signal and a negative voltage signal;

a voltage alternating switch circuit operatively coupled between the power supply and a twisted pair, said voltage alternating switch circuit operatively switches the positive and negative voltage signals between the wires of said twisted pair; and a controller coupled to the voltage alternating switch circuit for providing control signals thereto to control line powering to the twisted pair, said controller monitors the twisted pair to determine if any lines coupled thereto are on hook, and reversing the voltage signals provided to said twisted pair when all the lines are off hook.

2. The system of claim 1 wherein the power signals include a positive voltage signal and a negative voltage signal, and further, wherein the voltage alternating switch circuit operatively switches the positive and negative voltage signals between the wires of the twisted pair.

3. The system of claim 2 further including a line transformer operatively coupled to the voltage alternating switch circuit and the twisted pair to provide the power signals to the twisted pair.

4. The system of claim 3 wherein the line transformer includes a ring terminal and a tip terminal respectively coupled to the twisted pair such that the positive and negative voltage signals are provided thereto in accordance with the control signals.

5. The system of claim 3 wherein the positive voltage signal is provided to the ring terminal and the negative voltage signal is provided to the tip terminal during a first predetermined period, and further, wherein the negative voltage signal is provided to the tip terminal and the positive voltage signal is provided to the ring terminal during a second predetermined period.

6. The system of claim 5 wherein the first and second predetermined periods are non-overlapping.

7. The system of claim 6 wherein each of the first and second predetermined periods are 20 hours.

8. The system of claim 5 wherein first and second predetermined periods are alternately repeated such that the positive and negative voltage signals are alternately provided to the ring and tip terminals.

9. The system of claim 1 wherein the voltage alternating switch circuit includes a resistance to selectively discharge capacitances in accordance with the control signals.

10. The system of claim 9 wherein said resistance is a resistor of 1 kilo-ohms.

11. The system of claim 1 further including a line transformer operatively coupled to the voltage alternating switch circuit and the twisted pair to provide the power signals to the twisted pair.

12. The system of claim 11 wherein the line transformer provides impedance matching and isolation between the system and the twisted pair.

13. The system of claim 11 wherein the line transformer provides an inductance of approximately 3.5 mHenry.

14. The system of claim 1 wherein the magnitude of the power signals approximately ranges between 44 volts and 60 volts.

15. The system of claim 1 wherein the voltage alternating switch circuit further includes:

a plurality of switches operatively coupled to said power supply and said twisted pair; and a resistance operatively coupled to said plurality of switches and said twisted pair to selectively discharge capacitances in accordance with the control signals.

16. The system of claim 15 wherein said resistance is a resistor of 1 kilo-ohms.

17. The system of claim 15 wherein the power signals include a positive voltage signal and a negative voltage signal, and further, wherein the plurality of switches selectively switch the positive and negative voltage signals between the wires of the twisted pair.

18. A method for providing line powering to a twisted pair configured to transmit and/or receive signals, comprising the steps of:

discharging line voltages from a plurality of transmission lines by coupling a resistance between said transmission lines, and providing a discharge pause period for discharging the line voltages;

alternating the voltage signals to alternately provide to the respective transmission lines; and applying the alternated voltage signals to each transmission line such that each polarity of the voltage signal applied to each transmission line is reversed.

19. The method of claim 18 wherein step of discharging includes coupling a resistance between said transmission lines.

20. The method of claim 18 wherein the discharge pause period is approximately 500 mseconds.

21. The method of claim 18 wherein the step of discharging includes the steps of:

providing a discharge pause period for discharging the line voltages; and coupling a resistance between said transmission lines.

22. The method of claim 21 wherein the discharge pause period is approximately 500 mseconds.

23. The method of claim 18 further including the step of providing a settling period for alternating the voltage signals at the alternating step.

24. The method of claim 23 wherein the settling period is approximately 20 mseconds.

25. The method of claim 23 wherein step of discharging includes coupling a resistance between said transmission lines.

26. The method of claim 23 wherein said step of discharging includes the step of providing a discharge pause period for discharging the line voltages.

27. The method of claim 26 wherein the discharge pause period is approximately 500 mseconds.

28. The method of claim 23 wherein the step of discharging includes the steps of:

providing a discharge pause period for discharging the line voltages; and coupling a resistance between said transmission lines.

29. The method of claim 28 wherein the discharge pause period is approximately 500 mseconds.

30. The method of claim 18 wherein the transmission lines are digital subscriber loop (DSL) lines, and further, wherein the step of alternating includes the step of switching the voltage signals between the DSL lines.

31. A method for providing line powering to a twisted pair configured to transmit and/or receive signals in a communication system, comprising the steps of:

monitoring the telephone lines coupled to the communication system to determine whether they are on hook or off hook and repeating said monitoring until all telephone lines are on hook;

discharging line voltages from plurality of transmission lines;

alternating the voltage signals to alternately provide to the respective transmission lines; and applying the alternated voltage signals to each transmission line such that each polarity of the voltage signal applied to each transmission line is reversed.

32. The method of 31 wherein step of discharging includes coupling a resistance between said transmission lines.

33. The method of claim 31 wherein said step of discharging includes the step of providing a discharge pause period for discharging the line voltages.

34. The method of claim 33 wherein the discharge pause period is approximately 500 mseconds.

35. The method of claim 31 wherein the step of discharging includes the steps of:

providing a discharge pause period for discharging the line voltages; and coupling a resistance between said transmission lines.

36. The method of claim 35 wherein the discharge pause period is approximately 500 mseconds.

37. The method of claim 31 further including the step of providing a settling period for alternating the voltage signals at the alternating step.

38. The method of claim 37 wherein the settling period is approximately 20 mseconds.

39. The method of claim 37 wherein step of discharging includes coupling a resistance between said transmission lines.

40. The method of claim 37 wherein said step of discharging includes the step of providing a discharge pause period for discharging the line voltages.

41. The method of claim 40 wherein the discharge pause period is approximately 500 mseconds.

42. The method of claim 37 wherein the step of discharging includes the steps of:

providing a discharge pause period for discharging the line voltages; and coupling a resistance between said transmission lines.

43. The method of claim 42 wherein the discharge pause period is approximately 500 mseconds.

44. The method of claim 31 wherein the transmission lines are digital subscriber loop (DSL) lines, and further, wherein the step of alternating includes the step of switching the voltage signals between the DSL lines.

45. An apparatus for line powering a twisted pair, comprising:

a power supply configured to provide a plurality of signals each having a different polarity;

a plurality of terminals;

a switching network including:

a resistance;

a first pair of switches operatively coupled between said power supply and said plurality of terminals, and a second pair of switches operatively coupled between said resistance, said power supply and said plurality of terminals; and a controller coupled to said switching network to control said switching network in accordance with a predetermined timing such that each of said terminals alternately receive said different polarity signals in accordance with said predetermined timing;

wherein said controller controls said switching network such that during a first portion of said predetermined timing, said power supply is coupled to said plurality of terminals and during a second portion of said predetermined timing, said resistance is coupled to said plurality of terminals.

46. The apparatus of claim 45 wherein said power supply is operatively coupled to said first pair of switches via positive and negative power supply terminals.

47. The apparatus of claim 46 further including a battery coupled to said power supply, said battery configured to provide said plurality of signals having different polarity to said power supply.

48. The apparatus of claim 45 further including a capacitance coupled between said positive and negative power supply terminals.

49. The apparatus of claim 45 wherein said resistance includes a resistor having 1,000 ohms.

50. A method of line powering a twisted pair, comprising the steps of:

providing a plurality of signals each having a different polarity from a signal source;

selectively coupling a first pair of switches between said signal source and a plurality of terminals;

coupling said signal source to said plurality of terminals during a first portion of said predetermined timing, and coupling said resistance to said plurality of terminals during a second portion of said predetermined timing;

selectively coupling a second pair of switches between a resistance, and signal source and said plurality of terminals; and providing a plurality of control signals such that said first and second pairs of switches are selectively coupled in accordance with a predetermined timing and each of said terminals alternately receive said different polarity signals in accordance with said predetermined timing.

51. The method of claim 50 wherein said step of selectively coupling said first pair of switches includes selectively coupling said signal source to said first pair of switches via positive and negative power supply terminals.

52. The method of claim 51 further including the step of coupling a capacitance between said positive and negative power supply terminals.

53. The method of claim 50 wherein said resistance includes a resistor having 1,000 ohms.

54. The method of claim 50 wherein said signal source is a power supply.

* * * * *